United States Patent
Hwang et al.

(10) Patent No.: US 6,920,980 B2
(45) Date of Patent: Jul. 26, 2005

(54) CONTAINER

(75) Inventors: Peter G. Hwang, Vancouver, WA (US); Kevin A. Howard, Vancouver, WA (US); Frank Woodbery, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 10/179,821

(22) Filed: Jun. 24, 2002

(65) Prior Publication Data

US 2003/0234251 A1 Dec. 25, 2003

(51) Int. Cl.⁷ .............................................. B65D 73/00
(52) U.S. Cl. ..................... 206/470; 206/471; 220/4.22
(58) Field of Search ................................ 206/461–463, 206/466, 407, 470, 471, 320, 806; 220/4.23, 4.22

(56) References Cited

U.S. PATENT DOCUMENTS

| | | | |
|---|---|---|---|
| 3,504,787 A | * 4/1970 | Brockway | 220/4.23 |
| 3,937,389 A | * 2/1976 | Wind | 220/4.23 |
| 4,512,474 A | * 4/1985 | Harding | 206/461 |
| 4,669,610 A | * 6/1987 | Lindsey et al. | 206/471 |
| 5,018,622 A | * 5/1991 | Hartley | 206/470 |
| 5,060,814 A | * 10/1991 | Oglesbee | 206/471 |
| 5,143,215 A | * 9/1992 | Hartley | 206/467 |
| 5,176,272 A | * 1/1993 | Ryan | 220/4.23 |
| 5,485,919 A | 1/1996 | Samberg et al. | |
| 5,653,335 A | 8/1997 | Bauer et al. | |
| 5,685,426 A | 11/1997 | Marshall | |
| 5,755,323 A | 5/1998 | Zahn et al. | |
| 5,775,516 A | 7/1998 | McCumber et al. | |
| 5,816,408 A | 10/1998 | Indelicato | |
| 5,849,378 A | 12/1998 | Gask | |
| 5,863,414 A | 1/1999 | Tilton | |
| 5,947,283 A | 9/1999 | Marshall | |
| 6,016,913 A | 1/2000 | Tilton | |
| 6,065,589 A | * 5/2000 | Ouwens | 206/470 |
| 6,170,663 B1 | 1/2001 | Glassman | |
| 6,209,292 B1 | 4/2001 | Krahn | |
| 6,227,369 B1 | 5/2001 | Glassman | |
| 6,321,911 B1 | 11/2001 | Raimer et al. | |
| 6,330,945 B1 | 12/2001 | Reimer | |
| 6,364,114 B1 | 4/2002 | Glassman | |
| 6,419,091 B1 | 7/2002 | Gaffney et al. | |
| 6,726,004 B2 | * 4/2004 | Watson | 220/4.22 |
| 2001/0003114 A1 | 6/2001 | Hansen | |
| 2001/0006153 A1 | 7/2001 | Merrell et al. | |
| 2001/0007308 A1 | 7/2001 | Glassman | |

* cited by examiner

Primary Examiner—Luan K. Bui

(57) ABSTRACT

A container includes a substantially planar cover having a top surface, a lower portion and an upper portion. The container further includes a substantially planar base having a bottom surface, a lower portion, an upper portion, and a bottom wall. In addition, the container includes a flexible member joining the base and the cover for permitting the cover and the base to move relative to each between a joined position, defining a line of closure, and an opened position. The line of closure lies in a plane forming an angle with the bottom wall of between about 35° and about 60°.

23 Claims, 2 Drawing Sheets

CONTAINER

BACKGROUND

Containers used for a wide variety of assemblages may be formed from blanks comprised of sheet material of, for example, metal or paperboard. While the contents of the container may differ, a capability of providing structural integrity and exposure protection are sometimes regarded as worthwhile characteristics of such containers.

In some cases, containers may be oversized with respect to their contents. The larger container size enables the use of foam packing material and the like to provide content protection. Of course, after purchase, disposal of the foam may present environmental problems and the larger container size can be a detriment where shelf space, for example, is a consideration.

The protection of container contents is a consideration that is encountered at several points in a product distribution scheme. It is desirable, for example, that the container makes the trip from manufacturing source to retail establishment without damage. At the retail level, factors such as how favorably to display the container while protecting its contents come into play. In addition, the issues of product integrity and protection may be considerations after purchase as, for example, the assemblage comprises an image transfer device such as a printer and associated materials may be stored on occasion and, other occasions, transported from one place to another.

SUMMARY OF THE INVENTION

A container includes a substantially planar cover having a top surface, a lower portion and an upper portion. The container further includes a substantially planar base having a bottom surface, a lower portion, an upper portion, and a bottom wall. In addition, the container includes a flexible member joining the base and the cover for permitting the cover and the base to move relative to each between a joined position, defining a line of closure, and an opened position. The line of closure lies in a plane forming an angle with the bottom wall of between about 35° and about 60°.

DETAILED DESCRIPTION

Figure 1:
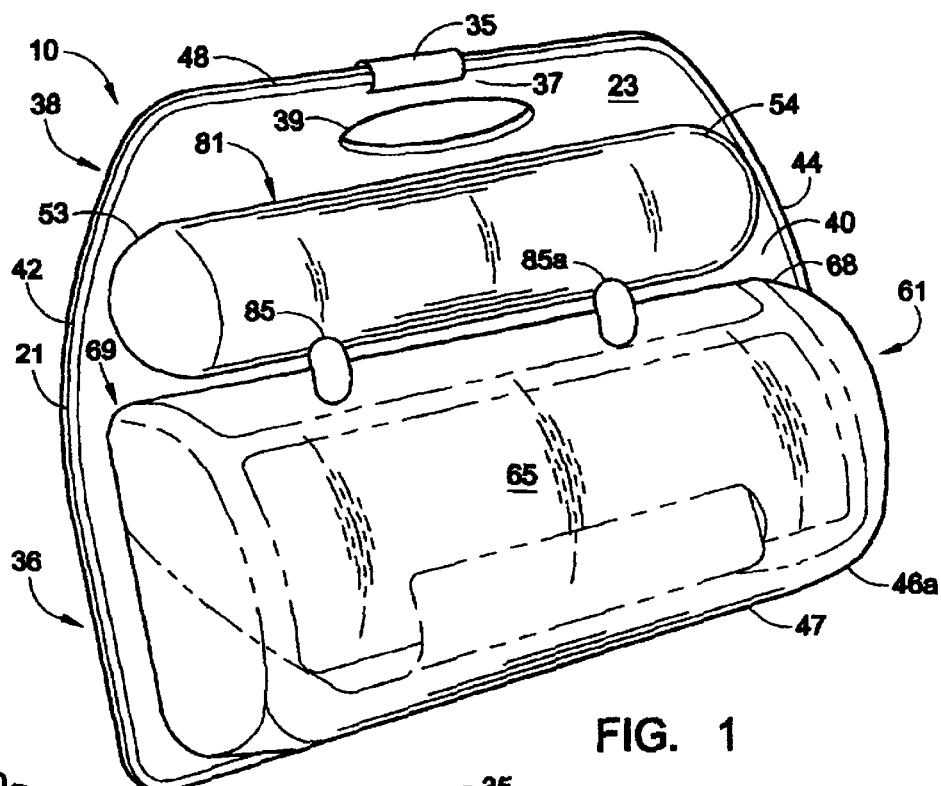
FIG. 1 is a front view of a printer container that is constructed according to an embodiment of the present invention.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

In the following detailed description and in the several figures of the drawings, like elements are identified with like reference numerals.

Referring now to the figures, the assemblage container, or printer and accessories container 10 (hereinafter referred to in this specification includes a as "printer container" includes a generally planar cover 21 joined at an integrally joined by a flexible member, such as living hinge 31, to a generally planar base 23. The cover 21 and the base 23 can rotate about the hinge 31 to move between an opened condition and a joined condition for periods of assembly storage, where such storage might include printer and peripheral equipment storage. The cover 21 is substantially planar, having a top surface 22.

Both the cover 21 and the base 23 have lower portions, generally indicated by reference numerals 36 and 36a respectively, and upper portions, generally indicated by reference numerals 38 and 38a respectively. The lower portions 36 and 36a have each formed therein a compartment or cavity, generally indicated by reference numerals 66 and 61 respectively, that, when the cover 21 and the base 23 are joined, the cavities form an enclosure, generally indicated by the reference numeral 69, that conforms substantially to the shape of an assembly such as a printer 65.

In a similar manner, the cover 21 and the base 23 upper portions, generally indicated by reference numerals 38 and 38a respectively, have each formed therein a compartment or cavity, generally indicated by reference numerals 67 and 87 respectively, that form an enclosure, generally indicated by the reference numeral 81, when the cover 21 and the base 23 are joined. The enclosure 81 includes a plurality of compartments 101 and 101a that are of sufficient capacity to hold ink cartridge containers such as the containers 103 and 103a. In addition, the enclosure 81 includes a compartment 105 for receipt and storage of a power supply 106.

Referring further to the drawings and in particular to FIG. 1. thereof, the cover 21 and the base 23 will be considered in more detail. As set forth above, the two are integrally joined by the living hinge 31, while a clasp 35 is located at the top of the container 10 to help hold the cover 21 and the base 23 together in a joined or storage condition. It will be noted, as shown that in the elevation views of FIGS. 2 and 3, the container 10 has a generally rectangular lower portion 36 and a generally trapezoidal upper portion 38. An opening 39, formed in the cover 21 and the base 23, affords a handhold 37 for convenient transport of the container 10 and its contents.

Considering now the cover 21 with reference to FIGS. 1–4, the cover 21 is substantially planar. As stated above, it includes the lower portion 36 having flat sidewalls 41 and 43 connected to a bottom wall 47 at radiused corners 45 and 46, respectively. A member or neck 40 is interposed between the lower portion and the upper portion 38.

Figure 2:
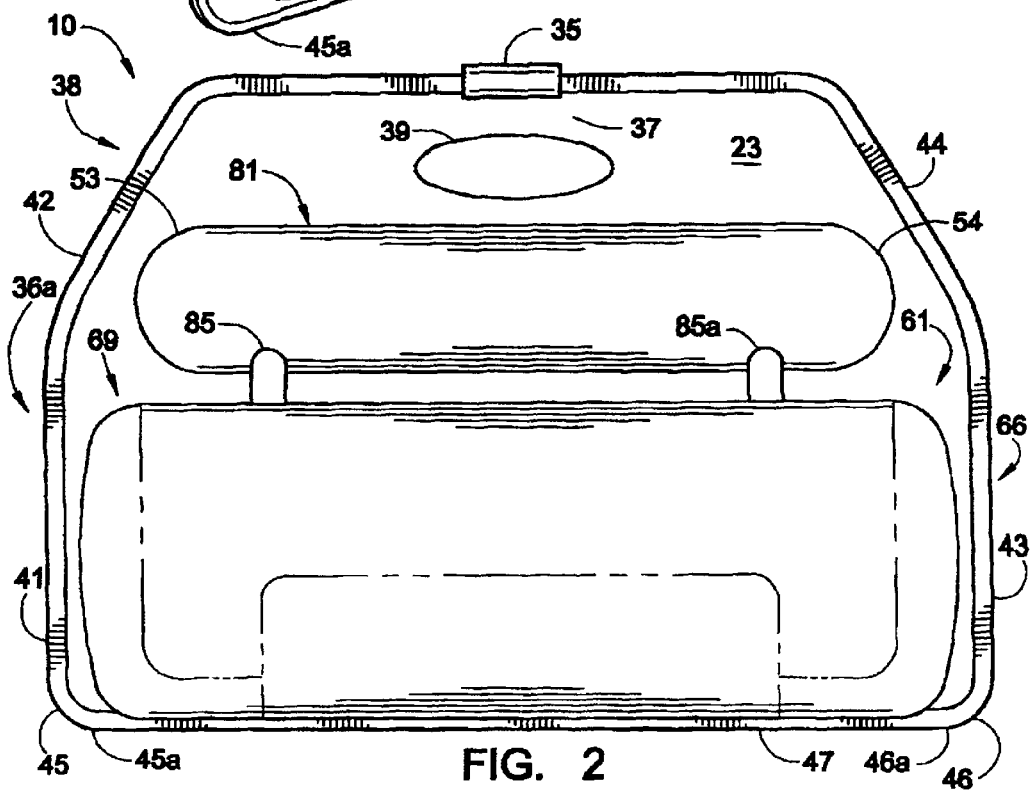
FIG. 2 is a front elevation view of the embodiment of the invention shown in FIG. 1.

The cover upper portion 38 is comprised of sidewalls 42 and 44 that are integrally connected, respectively, to the sidewalls 41 and 43. As best shown in FIGS. 1 and 2, the sidewalls 42 and 44 curve inwardly to join a top wall 48. As a result, the bottom wall 47 is wider than the top wall 48.

The base 23 is also substantially planar and is similar in dimensions and shape to the cover 21. It includes a bottom surface 23a. The base 23 includes the lower portion 36a and the upper portion 38a. The lower portion 36a includes a pair of sidewalls, one of which is the sidewall 43a that joins a bottom wall 47a at a radiused corner 45a. A neck 40a is interposed between the lower portion 36a and the upper portion 38a.

Figure 3:
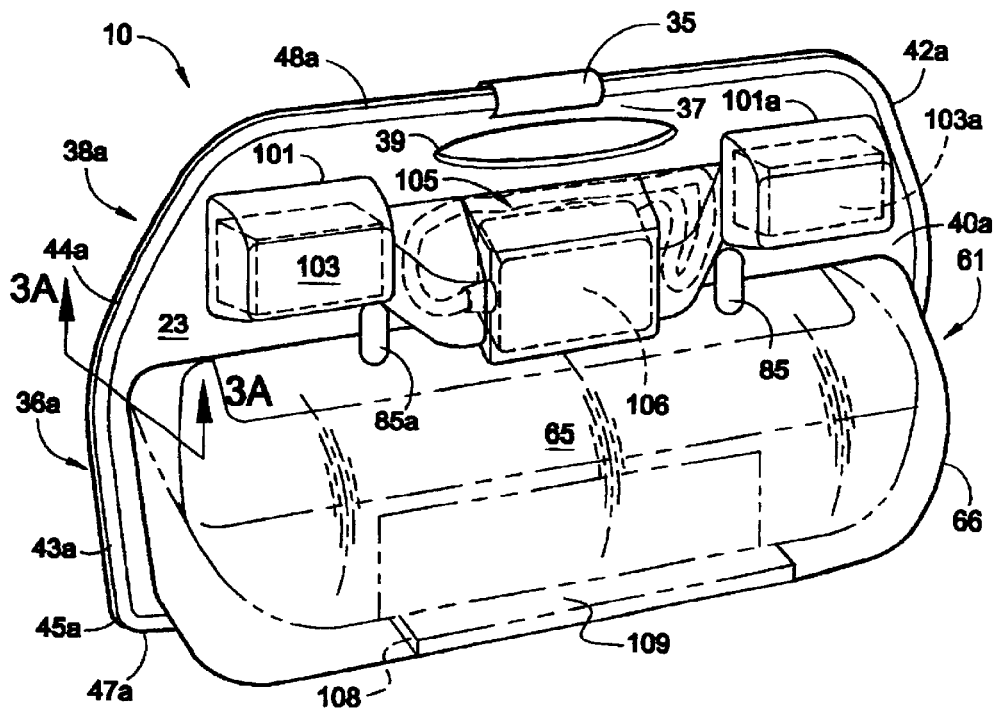
FIG. 3 is a rear perspective view of the embodiment of FIG. 1.
Figure 3A:
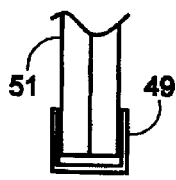
FIG. 3A is a cross-sectional view along line 3A—3A of the embodiment of FIG. 3.

The base 23 upper portion 38a includes a pair of sidewalls 42a and 44a, integrally connected to respective lower portion 36a sidewalls. As shown in FIG. 3, for example, the sidewall 44a is integrally connected to the lower portion sidewall 43a. In a manner similar to that of their counterparts on the cover 21, the sidewalls 42a and 44a curve inwardly to join a top wall 48a.

The shape and some other characteristics of the cover 21 and the base 23 have been set forth above. It is fitting at this time to describe the various cavities, best shown in FIGS. 3 and 4, formed in the cover 21 and in the base 23. In one case, a cavity 66 is formed in the lower portion 36 of the cover 21 and a complementary cavity 61 is formed in the lower portion 36a of the cover 23. These cavities are generally convex in shape wherein each respectively, opens away from the cover top surface 22 and the base bottom surface 23a. As stated above, when the cover 21 and the base 23 are joined together, the cavities 66 and 61 cooperate to form the shaped enclosure 69, suitable for receipt therein of an assemblage, such as the printer 65.

Figure 4:
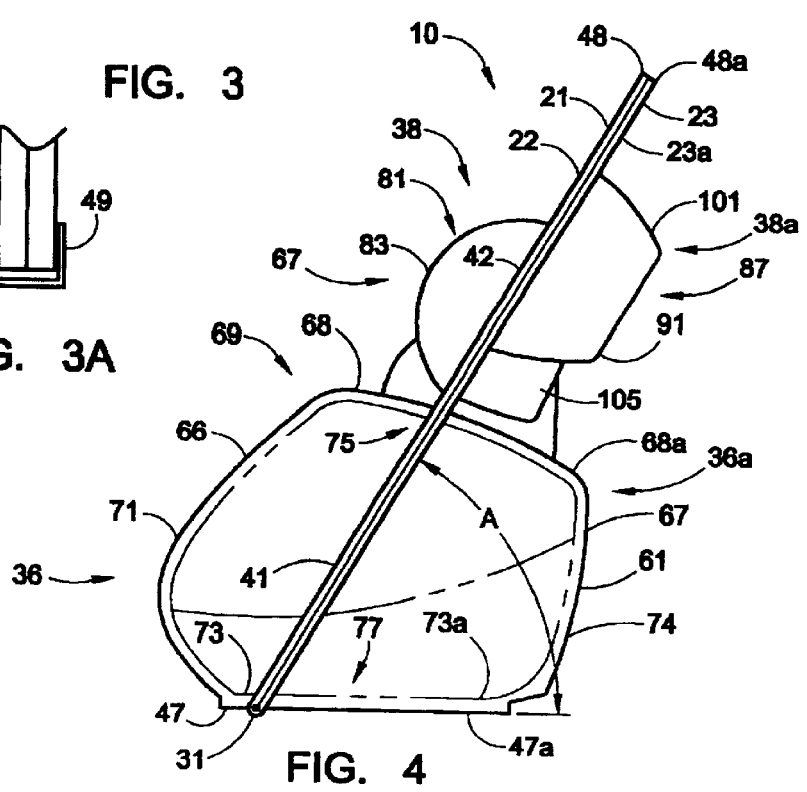
FIG. 4 is a left side elevation view of the embodiment of FIG. 1.

Considering now the enclosure 69 in greater detail and as best shown in FIG. 4, the enclosure 69 is comprised of a cover portion 66 and a base portion 61 joinable in a generally clamshell fashion when the container 10 is joined. The cover portion 66 is generally convex in shape opening away from the cover top surface 22. It includes a generally flat top wall 68, a curved front wall 71, and a generally flat bottom wall 73.

The base portion cavity 61 includes a generally downwardly curving top wall 68a, a rear wall 74 and a generally flat bottom wall 73a. As best shown in FIG. 4, the respective top walls 68 and 68a form a single top wall of the enclosure 69, the top wall generally indicated by the reference numeral 75 when the cover 21 and the base 23 are joined. In a similar manner, a bottom wall, generally indicated by reference numeral 77, is formed by the bottom walls 47 and 47a.

As shown in FIG. 4, the container 10 separates along a line of closure thereby dividing the container 10 into asymmetrical portions. The line of closure is formed by the contact between cover 21 and base 23. The line of closure lies in a plane parallel to the plane formed by sidewalls 42a, 43a, and 44a and parallel to the plane formed by base 23. An edge of the plane that includes the line of closure is defined by the living hinge 31. An angle A formed between the plane that includes bottom wall 47a and the plane that includes the line of closure can range from about 35 degrees to 60 degrees.

An upper compartment or cavity, generally indicated by a reference numeral 81, generally convex in shape, opening away from the cover top surface 22, is formed in the upper portion 38. The cavity 81 includes a curved wall 83 that, as shown in FIG. 4, in section has a generally arcuate shape. Flanking the curved wall 83 are curved sidewalls 53 and 54. Members 85 and 85a connect the cavity 81 and the cavity 61 to provide strength to the cover 21 and to reduce torquing moments to the cover 21 as it is moved, for example, from a joined position to an opened position The positioning of the printer 65 in the enclosure 69 has been discussed. As best shown in FIGS. 3 and 4, the cavity 81 opens upon an enclosure 87, when the container 10 is joined. The enclosure 87 includes a flat back wall 91 and it is comprised of a pair of laterally disposed compartments 101 and 101a for housing ink cartridges 103 and 103a, respectively, and a centrally located compartment 105 for housing a power supply 106. In addition, as best shown in FIG. 3, a recess 108 in the lower cavity 61 provides for a housing for a printer manual 109.

From the foregoing it will be appreciated that the container and container/printer combination provided by the disclosed embodiment of the invention provides an efficient technique for storing an assembly, such as a printer, and its accessories throughout the life of the printer. The assembly is mechanically simple while providing a secure environment for the printer and its accessories while conserving space and reducing waste deposited in landfills.

It will be evident that there are additional embodiments and applications that are not disclosed in the detailed description but which clearly fall within the scope of the present invention. The specification is, therefore, intended not to be limiting, and the scope of the invention is to be limited only by the following claims.

What is claimed is:

1. A container, comprising:
    a substantially planar cover having a top surface, a lower portion, an an upper portion, and a bottom wall;
    a substantially planar base having a bottom surface, a lower portion, an upper portion, and a bottom wall; and
    a flexible member joining said bottom wall of said base and said bottom wall of said cover, said flexible member permitting said cover and said base to move relative to each between a joined position, defining a line of closure, and an opened position, wherein said line of closure lies in a plane forming an angle with said bottom wall of said base of between about 35° and about 60°.

2. The container according to claim 1, wherein said cover and base lower portions are each generally rectangular in shape and said cover and said base upper portions are each generally trapezoidal in shape.

3. The container according to claim 1, wherein said cover and said base each includes a pair of oppositely disposed sidewalls, wherein said sidewalls are co-terminal with one another and contiguous with one another when said cover and said base are closed.

4. The container according to claim 1, wherein said cover and said base each includes a top wall, a substantially straight lower portion connected to said bottom wall, and a generally curved upper portion connected to said top wall, wherein each of said top walls is shorter than each of said bottom walls.

5. The container according to claim 1, wherein said lower portion and said upper portion of said cover each includes a generally convex cavity opening away from said top surface, and said lower portion of said base includes a generally convex cavity opening away from said bottom surface and said upper portion of said base includes a plurality of compartments opening away from said bottom surface, wherein said cavity in said lower portion of said cover and said cavity in said lower portion of said base each includes said bottom wall and a top wall wherein said top wall of said cover defines said cavity in said cover having a greater height than said cavity in said base.

6. The container according to claim 5, wherein said bottom wall of said cover and said bottom wall of said base are substantially flat and contiguous with one another when said cover and said base are closed.

7. The container according to claim 5, wherein said top wall of said cover and said top wall of said base are substantially flat and contiguous with one another when said cover and said base are closed.

8. The container according to claim 5, wherein said cavity in said lower portion of said cover includes a front wall having a generally flat upper portion and a generally curved lower portion.

9. The container according to claim 5, wherein said cavity in said lower portion of said base includes a generally flat rear wall.

10. The container according to claim 5, wherein said cavity in said upper portion of said cover includes a pair of arcuate sidewalls and a curved front wall.

11. The container according to claim 1, further comprising means for holding said cover and said base in a closed position.

12. The container according to claim 5, further comprising a plurality of strengthening members extended between said cavity in lower portion of said cover and said cavity in said upper portion of said cover.

13. The container according to claim 1, including an opening formed in said cover and said base to partially define a carrying handle.

14. The container according to claim 5, wherein at least one of said plurality of compartments includes a size to contain an inkjet cartridge package.

15. The container according to claim 5, wherein one of said plurality of compartments includes a size to contain a printer power supply.

16. The container according to claim 5, wherein said cavity in said lower portion of said base includes a region shaped to contain an operating manual.

17. A container, comprising:
a substantially planar cover having a top surface, a lower portion, and an upper portion;
a substantially planar base having a bottom surface, a lower portion, an upper portion, and a bottom wall; and
a flexible member joining said base and said cover for permitting said cover and said base to move relative to each between a joined position, defining a line of closure, and an opened position, wherein said line of closure lies in a plane forming an angle with said bottom wall of between about 35 degrees and about 60 degrees,
wherein said lower portion and said upper portion of said cover each includes a generally convex cavity opening away from said top surface, and said lower portion of said base includes a generally convex cavity opening away from said bottom surface and said upper portion of said base includes a plurality of compartments opening away from said bottom surface,
wherein said cavity in said lower portion of said cover and said cavity in said lower portion of said base each includes said bottom wall and a top wall, wherein said top wall of said cover defines said cavity in said cover having a greater height than said cavity in said base,
wherein at least one of said plurality of compartments includes a size to contain an inkjet cartridge package, wherein at least one of said plurality of compartments contains an inkjet cartridge.

18. A printer container, comprising:
a substantially planar cover having a top surface, a lower portion, an upper portion, and a bottom wall, wherein said lower portion and said upper portion each includes a generally convex cavity opening away from said top surface;
a substantially planar base having a bottom surface, a lower portion, an upper portion, and a bottom wall, wherein said lower portion includes a generally convex cavity opening away from said bottom surface and said upper portion includes a plurality of compartments opening away from said bottom surface; and
a hinge joining said bottom wall of said base and said bottom wall of said cover, said hinge permitting said cover and said base to move relative to each other between a closed position and an opened position;
wherein with said base and said cover in said closed position a first plane including a region of contact between said base and said cover exists at an angle between 35° and 60° with a second plane including said bottom wall of said base.

19. The printer container according to claim 18, wherein said cover lower portion cavity and said base lower portion cavity cooperate to form an equipment enclosure when said cover and said base are in a closed condition.

20. The printer container according to claim 18, wherein said cover upper portion cavity and a plurality of said base upper portion compartments cooperate to form a plurality of equipment enclosures when said cover and said base are in a closed condition.

21. A printer container, comprising:
a substantially planar cover having a top surface, a lower portion, and an upper portion, wherein said lower portion and said upper portion each includes a generally convex cavity opening away from said top surface;
a substantially planar base having a bottom surface, a lower portion, an upper portion, and a bottom wall, wherein said lower portion includes a generally convex cavity opening away from said bottom surface and said upper portion includes a plurality of compartments opening away from said bottom surface; and
a hinge joining said base and said cover for permitting said cover and said base to move relative to each other between a closed position and an opened position,
wherein with said base and said cover in said closed position a first plane including a region of contact between said base and said cover exists at an angle between 35 degrees and 60 degrees with a second plane including said bottom wall,
wherein said cover lower portion cavity and said base lower portion cavity cooperate to form an equipment enclosure when said cover and said base are in a closed condition,
wherein said equipment enclosure contains a printer.

22. A printer container, comprising:
a substantially planar cover having a top surface, a lower portion, and an upper portion, wherein said lower portion and said upper portion each includes a generally convex cavity opening away from said top surface;
a substantially planar base having a bottom surface, a lower portion, an upper portion, and a bottom wall, wherein said lower portion includes a generally convex cavity opening away from said bottom surface and said upper portion includes a plurality of compartments opening away from said bottom surface; and
a hinge joining said base and said cover for permitting said cover and said base to move relative to each other between a closed position and an opened position,
wherein with said base and said cover in said closed position a first plane including a region of contact between said base and said cover exists at an angle between 35 degrees and 60 degrees with a second plane including said bottom wall,
wherein said cover upper portion cavity and a plurality of said base upper portion compartments cooperate to form a plurality of equipment enclosures when said cover and said base are in a closed condition,
wherein at least one of said plurality of equipment enclosures contains an inkjet cartridge.

23. A printer container, comprising:

a substantially planar cover having a top surface, a lower portion, and an upper portion, wherein said lower portion and said upper portion each includes a generally convex cavity opening away from said top surface;

a substantially planar base having a bottom surface, a lower portion, an upper portion, and a bottom wall, wherein said lower portion includes a generally convex cavity opening away from said bottom surface and said upper portion includes a plurality of compartments opening away from said bottom surface; and a hinge joining said base and said cover for permitting said cover and said base to move relative to each other between a closed position and an opened position, wherein with said base and said cover in said closed position a first plane including a region of contact between said base and said cover exists at an angle between 35 degrees and 60 degrees with a second plane including said bottom wall, wherein said cover upper portion cavity and a plurality of said base upper portion compartments cooperate to form a plurality of equipment enclosures when said cover and said base are in a closed condition, wherein at least one of said plurality of equipment enclosures contains a printer power supply.

* * * * *

UNITED STATES PATENT AND TRADEMARK OFFICE
CERTIFICATE OF CORRECTION

PATENT NO.         : 6,920,980 B2
APPLICATION NO. : 10/179821
DATED              : July 26, 2005
INVENTOR(S)        : Peter G. Hwang et al.

It is certified that error appears in the above-identified patent and that said Letters Patent is hereby corrected as shown below:

Column 4, Line 53, after first occurrence of "top wall" insert --,--

Column 5, Line 12, before "lower" insert --said--

Signed and Sealed this

Twenty-seventh Day of May, 2008

JON W. DUDAS
*Director of the United States Patent and Trademark Office*